Patented Sept. 3, 1929.

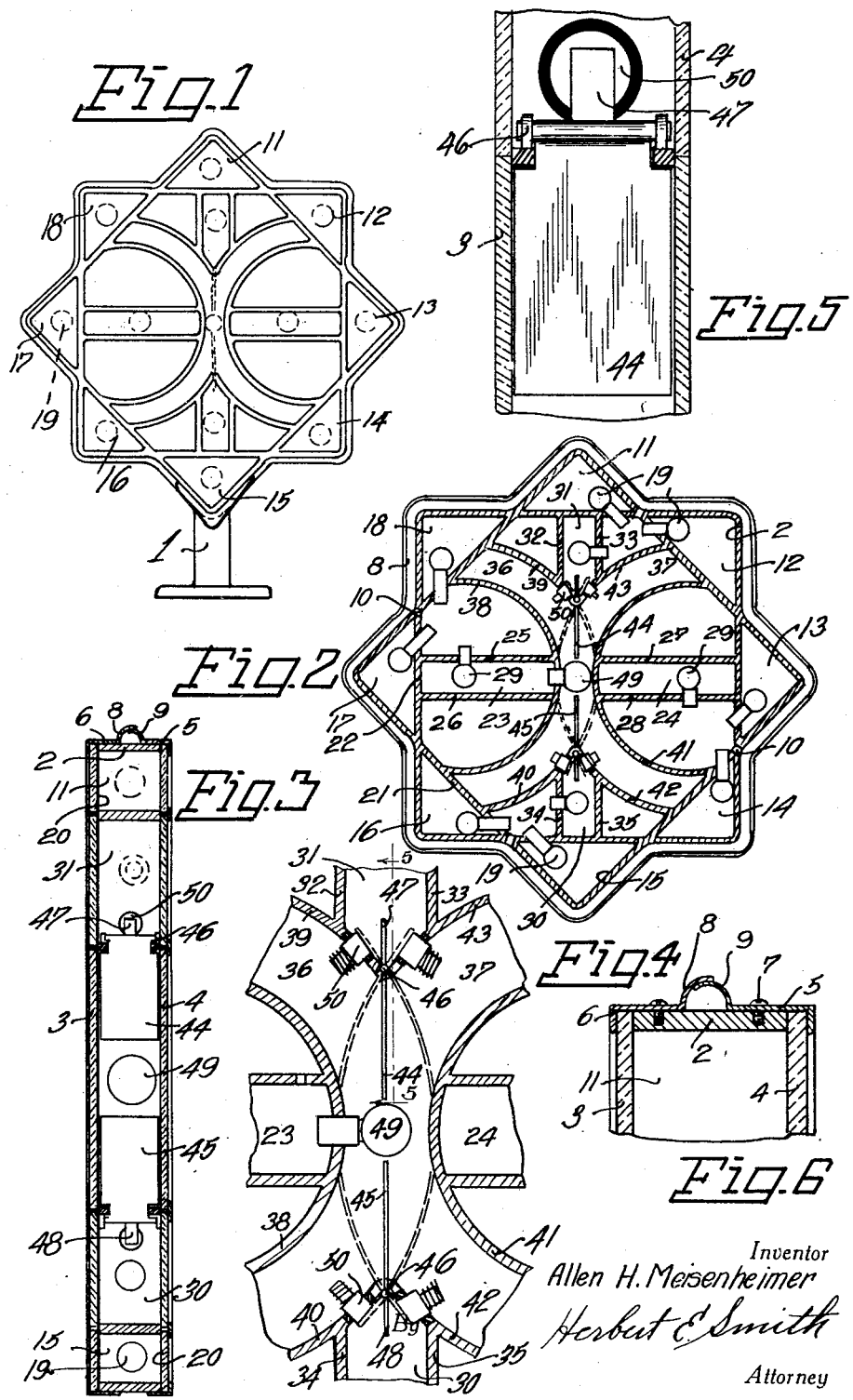

1,726,910

UNITED STATES PATENT OFFICE.

ALLEN H. MEISENHEIMER, OF SPOKANE, WASHINGTON.

DIRECTION INDICATOR.

Application filed February 23, 1927. Serial No. 170,166.

My present invention relates to an improved direction indicator for use on automotive vehicles, aircraft and water craft, as well as for use as a stationary or fixed indicator for directing or indicating traffic movements. As herein illustrated and described I have referred to the indicator as carried at both or either the front or back parts of an automotive vehicle for the purpose of signaling or indicating intended movements of the vehicle so equipped, but it will be understood that the indicator is capable of being adapted for various other purposes as above indicated.

The indicator is of the changeable, electrically illuminated type involving the use of colored or contrasting glass panels for the signals or indications, and arrows are employed as the symbols for indicating direction. The signal box for the indicators provides for a compact arrangement of a plurality of signals and suitable electric lighting or lamp circuits are used, and in some instances jointly used, for displaying a selected signal. Electro-magnetos are employed in connection with the plurality of signals for controlling the joint display of parts of the indicator selected from the plural signals. The usual forward right and left turns are indicated as well as backward or rear right and left turns may be indicated; the stop and back signals may be displayed, and a reverse movement may also be displayed as a signal of the device. The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in elevation showing one of the faces of the double-face signal box, as used on an automotive vehicle.

Figure 2 is a vertical sectional detail view of the box with one face removed to disclose the interior arrangement.

Figure 3 is a transverse vertical sectional view of the double face signal box.

Figure 4 is an enlarged sectional detail view at the center of the signal box, showing electro-magnets as control means for fashioning selected signals to be displayed.

Figure 5 is an enlarged detail view of the construction of Figure 4 at line 5—5 in said figure.

Figure 6 is an enlarged detail sectional view showing especially the hollow bead on the exterior edge of the signal, forming a conduit for the electric wires of the signal system.

As illustrated in Figure 1 the signal box or casing is provided with an attaching base 1 by means of which it can be affixed to the automotive vehicle at a preferred location in order that both the front and rear faces of the box are visible to display signals simultaneously. The exterior wall of the box is indicated as 2 and the fronts are provided with glass plates as 3 and 4. The glass panels or plates at the edges of the box are retained by means of metal plates 5 at the exterior of the box and these plates are fashioned with flanges 6 that overlap the edges of the glass panels, there being screws 7 provided for securing the flanged plates to the box.

At their inner adjoining edges the plates 5 are provided with curved or semi-circular flanges 8 and 9 that overlap to form conduits that extend around the box for the electric wires to the lamps and magnets enclosed within the box, and openings 10 are provided in the walls and partitions of the box for the accommodation of the wires as they are led in from the conduit.

The signal box is shaped like two squares superimposed with corners at the eight points of the compass to provide corners forming arrowhead compartments designated 11, 12, 13, 14, 15, 16, 17, and 18 in each of which is located an electric lamp 19. The glass panels 30 of these arrowheads may be colored, as red, to provide a contrast between the arrowhead and other parts of the face of the signal box, and the arrowhead compartments are separated from the interior of the box by partitions 21 and 22 arranged in sets and forming the outline of the two squares.

Some of the arrowheads are provided with straight shafts and others are provided with curved or arcuate shafts that are formed by the use of partitions within the octagonal space enclosed within the two sets of partitions 21 and 22, and the arrowheads and shafts are utilized in combination to form different selected signals. Thus the two horizontal compartments 23 and 24 that extend diametrically through the casing or box are formed by the use of parallel partitions 25, 26 and 27, 28, and a lamp as 29 is enclosed in each compartment. The two vertical compartments 30 and 31 are formed by the use of parallel partitions 32, 33 and 34, 35, and at the outer ends of all these compartments arrowheads are located. Two semi-circular or arcuate shape shafts 36 and 37 are formed in compartments that are bounded by partitions 38, 39, 40 and 41, 42, 43 respectively and at the ends of these shafts the arrowheads are also located.

Thus the left arcuate compartment 36 may be illuminated to form the shaft for the arrowhead 18 to indicate that the motorist intends to turn to the left while the shaft 37 and arrowhead 12 are illuminated to indicate a right turn. If the car is to be backed and turned at the same time the arrowheads 14 or 16 may be used with their complementary shafts or compartments. A vertical arrow shaft with double heads 11 and 15 may be displayed to indicate a stop while the lower shaft 30 and arrowhead 15 is used to indicate a backing movement of the automobile. Various other signals may be displayed and signals may be made up of different parts of the arrowheads and shafts in arbitrary combinations that may be used to form a code of signals.

As the two compartments 36 and 37 intersect at their centers, and for the purpose of varying the formation of the signals, means are provided for shutting off one compartment from the other at this central point to form a complete semi-circular curve or compartment. This is accomplished by the utilization of a pair of movable partitions 44 and 45 made up of flat plates of resilient metal and pivoted at 46 along the vertical axis of the signal box. The pivots are spaced apart from the center of the signal box and the resilient plates are designed to swing laterally in order that their free ends may contact with the curved partitions as 38 and 41 as indicated by dotted lines in Figure 2. When the free ends of the plates are pressed against the partitions the resilient plates are bent or flexed on the dotted lines to form continuations of these partitions and confine the light to the selected curved arrow-shaft.

Each of the hinged plates is provided with a smaller plate as 47 and 48 that form armatures for the electro-magnets 50 and the magnets are instrumental in swinging the resilient plates above and below the single lamp 49 that is used to illuminate selectively, both of the curved arrow shafts. There are four of the magnets, a pair for each resilient plate and they are connected in pairs in the lamp circuits with lamp 49. Thus if a right forward turn is to be indicated the circuits for the lamps 49, and 19 in compartment 12 are closed together with the circuit that controls the two magnets at the right of the center in Figure 4. When these magnets are energized the two resilient plates are swung laterally to the left in Figure 4 to complete the circular compartment 37.

Having thus fully described my invention, what I claim as new and desire to secure by Letters Patent is:—

1. The combination with a signal box having interior compartments adapted to form signal outlines and means for illuminating selected compartments, of a glass front for said box, a pair of fastening plates extending around the exterior of the box and complementary curved flanges on said plates forming a conduit for electric wires, said box having openings to the interior from said conduit, a glass front for the box and a retaining flange on each of said plates.

2. A direction indicator comprising a signal box, partitions in said box forming a pair of spaced light heads and a lamp in each head, partitions forming a pair of intersecting light-shafts for said heads and separated therefrom, said shafts being unobstructed and a single lamp for illuminating said shafts, and means whereby the light may be shut off from one shaft while the other shaft is illuminated.

3. A direction indicator comprising a signal box, partitions in said box forming a pair of spaced light-heads and an electric lamp for each head, intersecting light-shafts for said heads and separated therefrom, said shafts being unobstructed and a single electric lamp for illuminating the shafts, and electro-magnetically controlled means for shutting off the light from one shaft while the other is illuminated.

4. In a signal box, the combination with partitions therein forming a pair of curved, intersecting light shafts having an unobstructed interior, and a single lamp for illuminating said shafts, of a pair of oppositely disposed, pivoted, resilient plates located at the intersecting point of the shafts, and electro-magnetic means for actuating said plates whereby an illuminated shaft may be shut off from the remaining shafts.

In testimony whereof I affix my signature.

ALLEN H. MEISENHEIMER.